United States Patent [19]

Ruse

[11] Patent Number: 5,279,707
[45] Date of Patent: Jan. 18, 1994

[54] DIE DISCOLORATION REMOVER SOLUTION AND METHOD

[75] Inventor: Andrew D. Ruse, Alto, Mich.

[73] Assignee: Time Savers, Alto, Mich.

[21] Appl. No.: 965,997

[22] Filed: Oct. 23, 1992

[51] Int. Cl.$^5$ .......................... B44C 1/22; C23F 1/00; C23G 1/02

[52] U.S. Cl. .................... 156/664; 156/625; 156/654; 156/905; 252/79.2; 252/79.4; 134/3

[58] Field of Search .............. 156/625, 654, 656, 664, 156/640, 905; 252/79.2, 79.4; 134/3, 38, 39, 40; 264/36, 39

[56] References Cited

U.S. PATENT DOCUMENTS

| | | | |
|---|---|---|---|
| 405,716 | 6/1889 | Potts | 134/3 X |
| 1,549,411 | 8/1925 | Gravell | 252/79.2 X |
| 1,765,331 | 6/1930 | Gravell | 252/79.2 X |
| 1,832,979 | 11/1931 | George | 134/3 X |
| 1,935,911 | 11/1933 | Neilson | 148/8 |
| 1,992,045 | 2/1933 | Schweitzer | 148/8 |
| 2,070,487 | 2/1937 | Lutz | 148/8 |
| 2,116,034 | 5/1938 | McGaughey | 148/8 |
| 2,199,712 | 5/1940 | Neilson | 148/8 |
| 2,383,434 | 8/1943 | Hovis | 134/41 |
| 2,613,141 | 10/1952 | Cochran | 252/79.2 X |
| 2,650,156 | 8/1953 | Shelton-Jones | 252/79.2 X |
| 2,662,814 | 12/1953 | Swihart | 252/79.2 X |
| 2,942,956 | 6/1960 | Kelly | 252/79.4 X |
| 3,042,554 | 7/1962 | Swann | 148/6.15 |
| 3,095,379 | 6/1963 | Schwartz | 252/101 |
| 3,301,787 | 1/1967 | Cohn | 252/79.4 |
| 3,410,803 | 11/1968 | Hoover | 252/79.2 |
| 3,425,881 | 2/1969 | Cohn | 252/79.2 X |
| 3,440,095 | 4/1969 | Larsonneur | 134/3 |
| 3,448,055 | 6/1969 | Mickelson et al. | 252/79.3 |
| 3,457,107 | 7/1969 | Mickelson et al. | 134/3 |
| 3,575,747 | 4/1971 | Cohn | 252/79.2 X |
| 3,645,790 | 2/1972 | Burden et al. | 134/3 |
| 3,663,327 | 5/1972 | Ritzi | 134/3 X |
| 3,709,824 | 1/1973 | Oda et al. | 252/142 |
| 3,833,414 | 9/1974 | Grisik et al. | 134/3 |
| 3,997,361 | 12/1976 | Kendall | 134/28 |
| 4,080,246 | 3/1978 | Battisti et al. | 156/656 |
| 4,238,279 | 12/1980 | Tsubai et al. | 156/664 |
| 4,283,248 | 8/1981 | Kakuhashi et al. | 156/637 |
| 4,289,638 | 9/1981 | Svenson | 252/85 |
| 4,410,393 | 10/1983 | Russell et al. | 156/629 |
| 4,435,223 | 3/1984 | Dollman | 134/3 |
| 4,496,465 | 1/1985 | Whitehurst et al. | 252/79.2 |
| 4,496,466 | 1/1985 | Whitehurst et al. | 252/79.3 |
| 4,530,735 | 7/1985 | Whitehurst et al. | 156/642 |
| 4,540,448 | 9/1985 | Gautier et al. | 148/6.15 R |
| 4,569,779 | 2/1986 | JabaLee | 252/79.4 |
| 4,652,340 | 3/1987 | Tytgat et al. | 156/664 |
| 4,668,421 | 5/1987 | Dollman | 252/136 |
| 4,678,541 | 7/1987 | Tytgat et al. | 156/664 |
| 4,857,225 | 8/1989 | Terada et al. | 252/100 |
| 4,956,022 | 9/1990 | Mahmoud | 134/41 |
| 4,965,009 | 10/1990 | Baur et al. | 252/142 |
| 5,034,093 | 7/1991 | O'Tousa et al. | 156/664 |
| 5,098,517 | 3/1992 | Tytgat et al. | 156/666 |

*Primary Examiner*—William A. Powell
*Attorney, Agent, or Firm*—Price, Heneveld, Cooper, DeWitt & Litton

[57] ABSTRACT

An aqueous solution is provided for removing undesirable "heat discoloration" characteristics from a mold surface, the solution consisting essentially of about 17% to 21% by weight phosphoric acid and about 1% of non-ionic surfactant, the remaining portion being substantially water, with a small amount of colorant and/or fragrance being optionally added as desired. The method of use includes applying the solution to a mold surface of a mold half, the mold surface having undesirable "heat discoloration" characteristics thereon caused while heating the mold half for repair, and removing any residue after about 30 seconds or less thereafter. In particular, the undesirable "heat discoloration" characteristics normally occur after heating the mold half during the process of repairing a damaged mold surface or reworking a mold surface requiring an engineering change. The undesirable "heat discoloration" characteristics require removal to prevent blemishes from being formed on a plastic part during molding of the plastic part, or non-uniform release caused by sticking of the plastic molded part to the mold surface during molding. Optimally, the solution is manually brushed on so that it can be applied as desired to particular mold areas such as those including crevices, depressions and/or mold shutoff areas, and wiped off after several seconds.

41 Claims, 3 Drawing Sheets

DIE DISCOLORATION REMOVER SOLUTION AND METHOD

BACKGROUND OF THE INVENTION

The present invention concerns a solution and method to expedite reworking molds for molding plastic parts, and in particular concerns a chemical solution and method for treating a mold half having mold surfaces to remove undesirable "heat discoloration" characteristics caused by heating the mold half while repairing or reworking the mold surfaces. Use of this solution and method reduces the time required for the repair or rework to a small fraction of that normally required, and also reduces the opportunity for human error.

Molded plastic parts offer a number of advantages over more traditionally manufactured sheet metal parts. For example, a complete part can often be made in a near finished condition including desired surface finishes in a single press cycle at very competitive costs. Further, plastic materials having special properties can be used Still further, the molds for making the parts can often be made with comparatively short lead times, and engineering changes can be made in the molds either before or after the molds are completed without the need to change an entire series of dies.

Molds for the plastic parts are characterized by a cover half and a corresponding ejector half adapted to open and close against each other, which ejector half and cover half include mold surfaces that cooperatively define a cavity in the shape of a part. These mold surfaces may be damaged if the mold halves are closed on a sharp object or on a previously formed part. Further, these mold surfaces wear and require maintenance, or may fracture over time with fatigue. Still further, engineering changes often need to be made for product improvement or fixes. Where the mold surface rework or repair requires adding material to one of the mold halves, the rework or repair can become unacceptably long, labor intensive, and expensive, as noted below.

In particular, adding material involves welding material to the mold surface, removing the excess material, and then "benching" and polishing the mold surface finish back to a desired surface finish. In order to minimize or eliminate weld lines, the mold half to be reworked is preheated before welding. However, during the process of heating the mold half, undesirable characteristics occur on the mold surface due to the particular steels used in making molds. These undesirable characteristics are visible as bluish haze known in the trade as "heat discoloration". These undesirable characteristics cannot be tolerated since they cause blemishes on the finished surface of a molded part, and further since they can cause non-uniform adhesion of the plastic to the mold surface, thus resulting in mold release problems as the molded plastic part is ejected from the mold.

Historically, these undesirable "heat discoloration" characteristics have been removed by many hours of tedious work in the form of "benching" and manually polishing to delicately abrasively bring the mold surface back to the required surface finish. This required surface finish is comparable to that of jewelry, and often must be accurate to within thousandths of an inch or better. This benching method of removal can actually take hours and even days of skilled labor time since it requires careful tedious polishing of the mold surfaces, including areas that were not repaired or reworked. Further, damage can occur by over-polishing sensitive areas of the molds, such as by over-polishing shutoff areas on the mold (i.e. areas that prevent plastic from leaking out of the cavity during the molding process) thus causing flash, or by over-polishing details on the mold surface thus causing the details to become "washed out". Further, ribs and other deep crevices or sharp corners may be difficult to properly polish, or even impossible to reach, such that the heat discoloration characteristics cannot adequately be removed, leading to manufacturing problems or unresolvable part defects. Yet, such tedious, costly benching and polishing is believed to be universally practiced in high quality tool and die shops and generally through the tool and die industry.

Thus, a method and solution is desired to solve the aforementioned problems to avoid a substantial amount of tedious and costly benching and polishing.

SUMMARY OF THE INVENTION

The present invention provides a method for removing undesirable heat discoloration from mold surfaces without benching or polishing. The novel method has been found to be fully effective in removing heat discoloration in just seconds, rather than hours or days, and to do so dependably and controllably without damage to the highly refined die or mold surfaces, thus restoring the surface to a jewel-like character. The method can be performed by applying a particular chemical solution to the discolored surface area, and then wiping if off seconds later. The method involves providing an aqueous solution of phosphoric acid having a non-ionic surfactant therein, positioning a mold half having a mold surface with undesirable heat discoloration thereon, applying the solution to the mold surfaces, and waiting several seconds until the heat discoloration visibly vanishes. The preferred method also includes the steps of wiping the surface area to remove any residue.

The invention also comprises a solution for treating a mold surface to remove undesirable "heat discoloration" characteristics from the mold surface, the solution consisting essentially of about 10% to 25% by weight phosphoric acid and a non-ionic surfactant in an amount sufficient to promote wetting of the surface by the phosphoric acid when applied to a mold surface, the remaining ingredient being substantially all water.

These and other features, advantages and objects of the present invention will be further understood and appreciated by those of ordinary skill in the art by reference to the following specification, claims and appended drawings.

DETAILED DESCRIPTION OF THE PREFERRED EMBODIMENT

Figure 6:
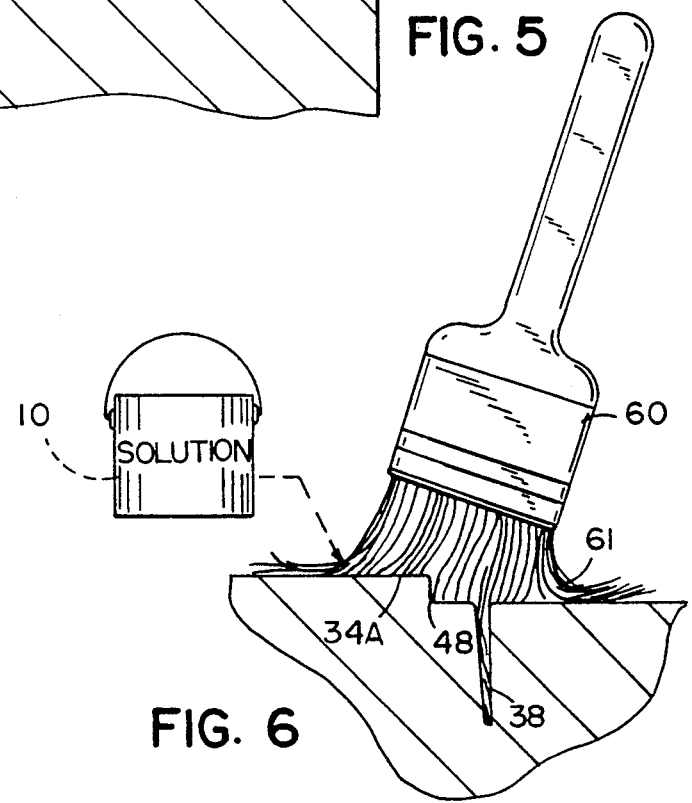
FIG. 6 is a schematic view showing a method of applying the solution, the method and solution embodying the present invention.

A preferred solution and method embodying the present invention is described hereinafter, the solution being generally referred to as numeral 10 (FIG. 6). Solution 10 is surprisingly effective and particularly adapted to be manually applied to a mold surface to remove undesirable "heat discoloration" characteristics thereon, which heat discoloration characteristics are caused by heating a mold half to an elevated temperature during the process of repairing the mold half. These characteristics cause blemishes on a plastic part molded in a mold including the reworked mold half, and also can cause undesirable non-uniform adhesion of the plastic part to the mold surface, thus hampering release of the part from the mold.

Solution 10 is made by diluting 1 gallon of 75% by weight phosphoric acid with 4 to 5 gallons of additional water, and then adding about 8 ounces of non-ionic surfactant along with a desired amount of water-soluble color and fragrance. In particular, the non-ionic surfactant used by myself was LI 700 non-ionic surfactant sold by Loveland Industries, Inc., although it is contemplated that the invention includes other non-ionic surfactants, soaps, or wetting agents. The more dilute solution having 5 gallons of added water has proven to be very satisfactory for general use, although the more concentrated solution of 4 gallons of added water has proven desirable in certain applications such as where the characteristics are particularly severe or are in difficult to reach locations.

In particular, the more dilute solution includes one part of 75% by weight phosphoric acid having a density of about 1.57 grams per/cm$^3$ at 25° centigrade, which is diluted by 5 parts of water and a relatively small amount of non-ionic surfactant to a final solution of about 17.5% to 18% by weight phosphoric acid having a density of about 1.10 gram per/cm$^3$. The more concentrated solution is diluted by only 4 parts of water and a relatively small amount of non-ionic surfactant to a final solution of about 21% by weight phosphoric acid, the solution having a density of about 1.12 grams per/cm$^3$. It is contemplated that concentrations outside of this range could also be used, however the above noted concentrations have been found to be most satisfactory to date. Notably, the solution can be applied manually and safely without fire hazard or other extreme safety hazards, although proper care should be taken as with all chemical solutions.

The preferred solution includes phosphoric acid as its only acid and no other acids since other acids which were tested such as for example hydrochloric acid, sulfuric acid, and acetic acid have been found to unacceptably etch away metal on the mold surfaces to be treated. Further, rust or oxidation tends to occur quickly after use of some of these other acids, which does not occur with the preferred solution as specified above. However, it is contemplated that small (dilute) additional amounts of these other acids could be added to the preferred solution for special application, and are to be considered as included in the scope of the present invention unless specifically excluded.

METHOD OF USE

Solution 10 is particularly adapted to be manually applied to a mold surface to remove undesirable "heat discoloration" characteristics thereon. As noted in the Background of the Invention, molds in need of repair or rework are commonly heated during the process of repairing/reworking the mold so that weld lines do not occur in the repaired area of the mold. The undesirable characteristics appear as a bluish haze commonly referred to heat discoloration, and occur when the mold steel temperature reaches an elevated temperature such as above 600° F. More specifically, the characteristics begin to appear as a yellowish color at about 400° F., and gradually change in color to brown-yellow at about 500° F., and to blue at about 550° F. to 600° F. The chemical composition or reaction leading to formation of the characteristics is not known by myself, but it is believed to be a result of oxidation and of other elements being deposited on the mold surface, which other elements are located either in the mold steel or in the air reacting with or being deposited or formed on the surface of the steel.

Figure 1:
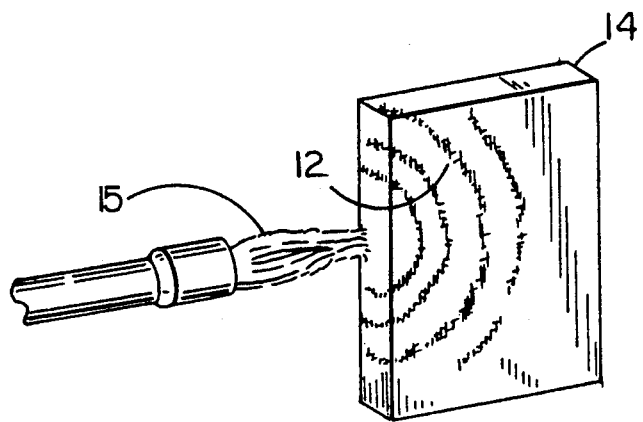
FIG. 1 is a schematic illustrating undesirable "heat discoloration" characteristics being formed on a mold steel, which characteristics are removable by the method and solution of the present invention.

FIG. 1 is included to illustrate characteristics 12. In the illustration, a block 14 of mold steel has been heated by a heat source 15, and the heat discoloration characteristics 12 are beginning to occur as the mold steel reaches the elevated temperature. More typically, the entire mold half in need of repair is uniformly heated to the elevated temperature, and the undesirable characteristics 12 occur substantially across the entire mold surface, though to varying degrees. Notably, the mold steel temperatures vary depending upon the type of repair or rework required, but typically the pre-repair temperatures range between 600° F. to 900° F., and the post-repair temperature range up to 1100° F., with higher polished mold surfaces requiring hotter preheat temperatures and longer post-heat (annealing) temperatures.

Solution 10 has been tested on and proven effective on steels used for making molds for molding plastic parts. In particular, most steel mills have developed special grades of steels for use in making molds for plastic parts. The steels must be very olean and free from voids, and also must be dimensionally stable when hardened. Further, the steel must be readily machineable and able to take on a jewel-like surface finish, yet be as low in cost as possible. The composition of two such steels in particular are known. Finkl Company sells a P20 TM steel for molds, the steel composition being about 0.32% to 0.36% carbon (0.34% aim), about 0.80% to 1.00% manganese (0.95% aim), about 1.60% to 2.00% chromium (1.85% aim), about 0.30% to 0.50% molybdenum (0.38% aim), about 0.015% maximum sulfur (0.0025% aim) and about 0.015% maximum phosphorous (0.008% aim). Carpenter Technology Corporation, Carpenter Steel Division, Reading, Pa., also sells a VEGA ® steel for molds, the steel having a typical content of about 0.70% carbon, about 2.00% manganese, about 0.30% silicon, about 1.00% chromium and about 1.35% molybdenum.

Figure 2:
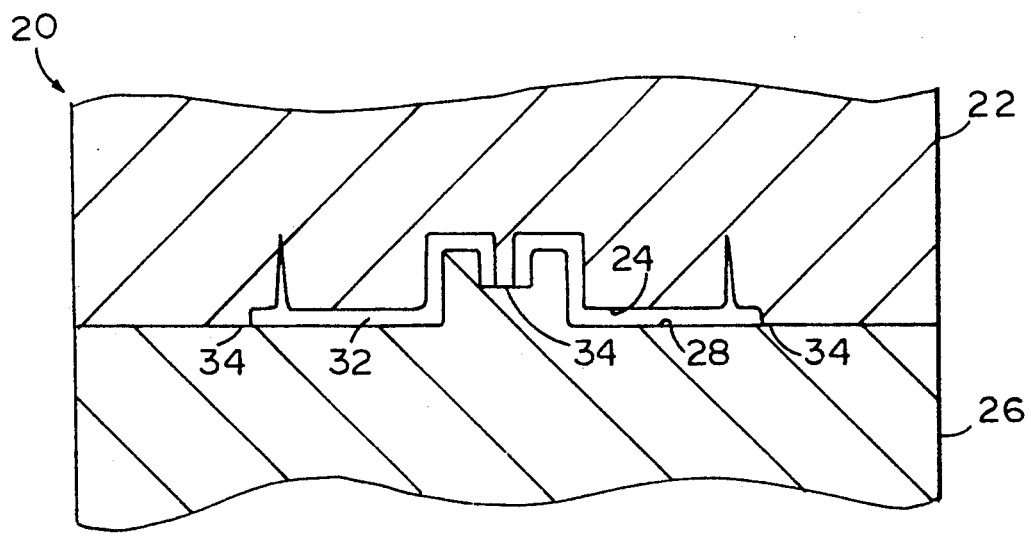
FIG. 2 is a cross-sectional view of an exemplary mold for molding a plastic part.
Figure 3:
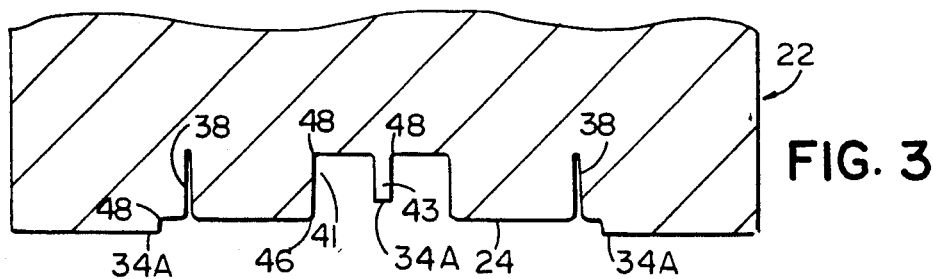
FIG. 3 is a cross-sectional view of the ejector half of the mold shown in FIG. 2.

An infinite variety of molds for molding plastic parts can be made. One such mold 20 is shown in FIG. 2 for the purpose of illustrating the various parts of a mold and their relevance to the present invention. Mold 20 includes an ejector half 22 (FIGS. 2 and 3) with a first jewel-like mold surface 24 defining a backside of a circular plug-like part 30 (FIG. 4), and a cover half 26

Figure 4:
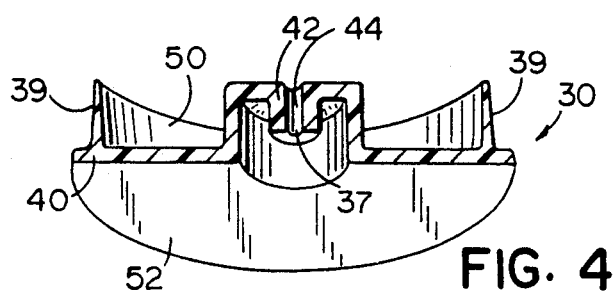
FIG. 4 is a cross-sectional perspective view of the plastic part molded in the mold shown in FIG. 2.
Figure 5:
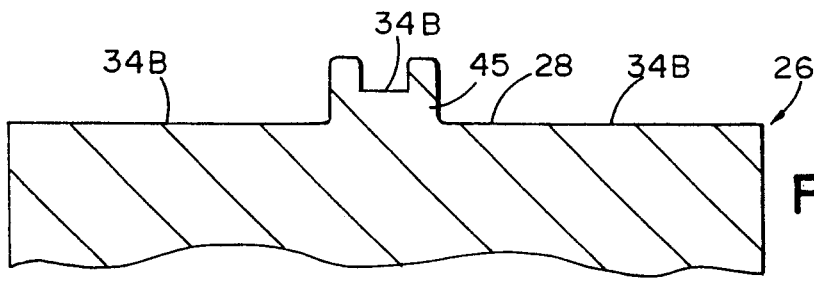
FIG. 5 is a cross-sectional view of the cover half of the mold shown in FIG. 2.

FIGS. 2 and 5) with a second jewel-like mold surface 28 defining the front side of the part 30, the mold surfaces 24 and 28 defining a cavity or chamber 32 (FIG. 2) in the shape of the part 30 (FIG. 4) when mold halves 22 and 26 are mateably joined. As is widely known, the process of injection molding part 30 includes generally closing mold halves 22 and 26, injecting plastic into cavity 32 and cooling the plastic, splitting apart mold halves 22 and 26 with the plastic part being temporarily held in ejector half 22, and ejecting part 30 from ejector half 22.

Mold halves 22 and 26 commonly include several important features and details on mold surfaces 24 and 28, such as shutoffs 34 and crevices 38. Shutoffs 34 (FIG. 2) are formed by mating surfaces 34A and 34B (FIGS. 3 and 5) that provide metal to metal contact limiting plastic flow, such as along the edge of cavity 32 or in other places such as on the tip of protrusion 36 for forming opening 37 in the part 30 (FIG. 4). Flash forms when plastic escapes past a shutoff 34. A considerable amount of skilled labor time is spent spotting the mold halves 22 and 26 mateably together to limit the amount of flash formed along shutoffs 34 so that the flash does not have to be later removed from the part after molding. Typically, the shutoffs 34 must close to less than one thousandths of an inch to satisfactorily prevent flash from occurring. Deep rib-like crevices 38 are also often formed in mold halves 22 and 26 to form ribs 39 in plastic parts 30, the ribs 39 reinforcing and supporting portions of parts 30 such as part flanges 40 to prevent warpage of same. Larger boss-like cavities 41 and protrusions 43 are also often formed in mold halves 22 and 26 to form bosses 42 with holes 44 so that screws (not shown) can be threaded directly into holes 44 to secure the part 30 to a mounting structure (not shown), thus facilitating later assembly of the part.

An advantage of molds is that the plastic molded part takes on the shape and surface finish of the mold cavity in which it is molded. Thus, parts can be molded in a near finished condition, including such fine detail as sharp edges 46 and radii 48 (FIG. 3), and including contoured shapes having desired surface finishes such as smooth back surface finish 50 and front textured surface finish 52 (FIG. 4). Since the plastic molded part takes on substantially the exact shape and characteristics of the mold surface, great care must be taken when repairing a mold surface, or reworking a mold surface to make engineering changes.

Often it is necessary to add material to the mold surface such as by welding To minimize stress and weld lines that occur from welding, the mold half to be reworked is first heated to an elevated temperature. This elevated temperature is usually above 600° F. and most typically is about 600° F. to 900° F. As the steel is heated above 400° F. and further heated to the desired elevated temperature, undesirable characteristics 12 form on the mold surface. These characteristics 12 are commonly referred to as heat discoloration, and are most typically visible as a bluish haze. As noted previously, I do not know the exact composition of the heat discoloration, but believe it to be a combination of surface oxidation and also other elements rising to or being deposited on the mold surface, the other elements being from below the mold surface or from the air proximate the mold surface during the heating process.

Once the mold half desired temperature is reached, material is welded onto the desired area. Then the mold half is annealed at an even higher temperature such as 1100° F., and then slowly and uniformly cooled. Once cooled, the excess weld material is removed. As long as the mold steel is properly heated before welding, the weld will not have a weld line around it, and will look substantially like the surrounding area. The excess material is then removed from the welding. However, the mold surface must still be abrasively reworked or "benched" to bring the mold surface up to the desired surface finish so that the repaired area will not show up as a blemish on a molded part. This involves manually bringing the mold surface up through different levels of surface finish with the use of abrasive materials such as sandpaper, stones, burns, files, compounds and other grit bearing substances. For example, on a highly polished surface, the die repairman may use an 80 grit paper or a surface grinder initially, followed by application of a fine scotch pad, 180 grit paper, 320 grit paper, 600 grit paper and a diamond finish. On less highly polished surfaces, the benching might end with a 320 grit paper. Also, once the surface finish is properly matched, a texture may be added.

The significance of the undesirable characteristics 12 is at least threefold. The characteristics 12 show up as blemishes on the molded parts, and thus are objectionable particularly if the characteristics 12 are on a show surface such as if they are on the mold surface 28 of the mold cover half 26. Also, the characteristics 12 often cause molded plastic parts to non-uniformly adhere to the mold surface 24 or 28, thus causing non-uniform release of the part from a mold half or part release problems. For example, if characteristics 12 are present along the sidewalls of the protrusion 45 on mold cover half 26, the molded part may not properly release from the mold cover half 26 as the mold halves are separated, thus requiring that the molding process be stopped and the plastic part be manually removed. Also, characteristics 12 in crevice 38 can cause the plastic to non-uniformly release from crevice 38, thus tearing or fracturing rib 39 on part 30 as the part is forceably ejected by ejectors (not shown) on ejector half 22.

However, when removing characteristics 12, extreme care must be used since over-polishing and excess material removal may be as damaging or even more damaging as under-polishing. For example, over-polishing or over-benching any area on shutoffs 34 will cause the shutoffs to not close in metal-to-metal contact, thus resulting in undesirable flash on molded parts which must be trimmed from the molded part. At the same time, details such as sharp edges 46 and radii 48 are quickly washed out to an unacceptable level by over-polishing/over-benching. Further, some features such as the crevices 38 and the boss-like cavity 41 are very difficult to uniformly olean, and it is almost impossible to determine when and if all of characteristics 12 are removed therefrom. Still further, each of the above pose a very large chance of human error, particularly since the work is repetitive, time consuming and tedious. Notably, shutoffs 34 often cannot be properly tested until the repaired mold half is mated against the other mold half. Thus, prior to the present invention, the undesirable characteristics 12 must be removed manually with skilled labor at considerable time and expense, and at considerable risk of over-polishing/over-benching. For example, it is not uncommon to spend 40 to 60 hours benching and polishing mold surfaces on a large mold such as for a vehicle front end panel.

In the method of the present invention, solution 10 is manually applied to the mold surface such as by a brush 60 (FIG. 6), and any residue not evaporated away after about 15 to 30 seconds is wiped off. Longer times can be used without damaging the mold, but I prefer to remove the residue at least by about 60 seconds. As shown in FIG. 6, the bristles 61 of brush 60 allow a thorough coating of such items as crevices 38, corners 48, and the like. Notably, solution 10 does not unacceptably remove or etch the metal of the mold surface, and thus any texture or surface finish is left undisturbed on the mold surface. Thus, the details and shutoffs of the mold are unaffected, and are not unacceptably etched even if the solution is left on the mold longer than intended. Also, the application of the solution and later removal is readily and safely accomplished, and the possibility of human error is virtually eliminated. This allows low skill level employees to be used to perform the task in a manner of minutes, which task used to take several hours by skilled die repairmen. In one known example, over 60 hours of die repair time was eliminated by use of the present solution and method.

Notably, I have also experimented with solutions containing varying amounts of other acids such as hydrochloric, acetic, citric and sulfuric acids. While it is contemplated that aqueous phosphoric solutions including small amounts of such acids would work, it has been found that significant amounts of these additional acids cause etching of the metal on the mold surfaces. Further, the mold surfaces tend to oxidize and or rust relatively quickly after application of some of these additional acids, such as with hydrochloric acid, whereas with the preferred solution 10 described above, the residue components of the solution left on the mold actually inhibit corrosion.

Figure 7:
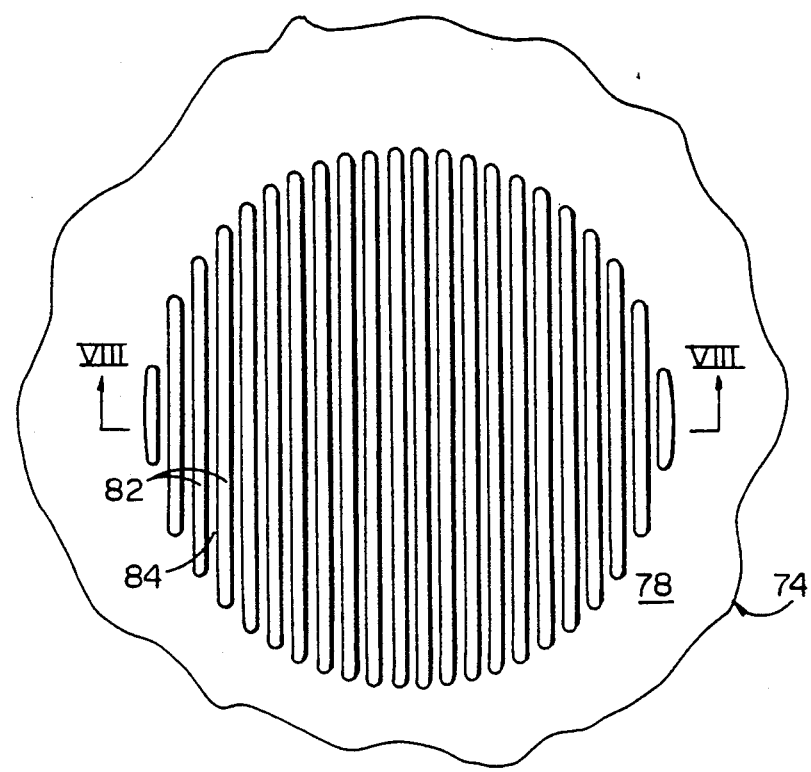
FIG. 7 is a fragmentary plan view of a second exemplary mold cover half.
Figure 8:
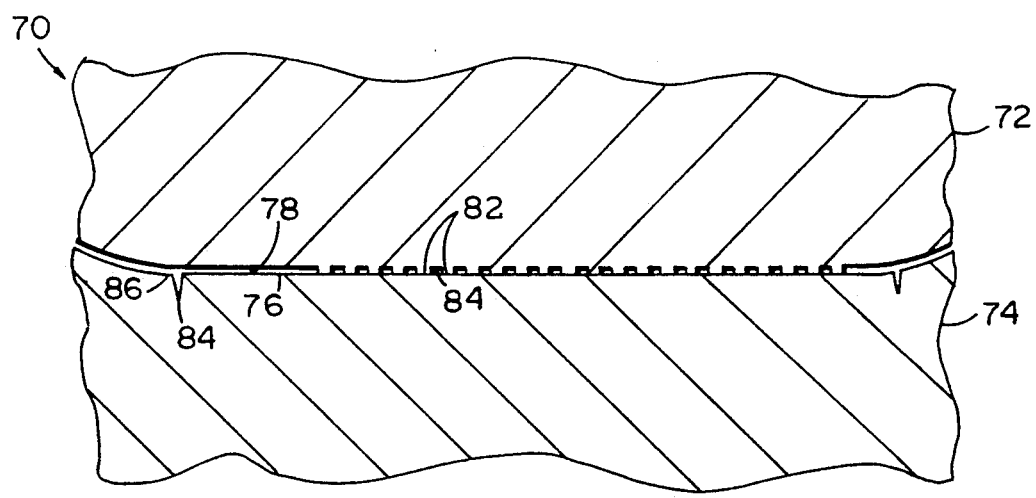
FIG. 8 is a cross-sectional view taken along the lines VIII—VIII in FIG. 7, the ejector half also being shown.

A second example of a mold where this invention is useful is shown in FIGS. 7 and 8. Mold 70 includes an ejector half 72 and a cover half 74. The two halves 72 and 74 include mold surfaces 76 and 78 respectively that define a speaker grill such as for an automotive instrument panel, the mold cover half 74 including elongated ridges 82 spaced apart by elongated openings 84. Ridges 82 result in openings in the molded part that allow sound generated by a speaker (not shown) below the part to escape through the part. In the speaker grill, it is critical that ridges 82 be virtually identical in shape (i.e. not washed out or having different cross-sectional sizes) and that no flash occur (i.e. shutoff surfaces on mold halves 72 and 74 along ridges 82 be in full metal-to-metal contact) since the grill is highly visible. Also, grill 80 includes a reinforcement rib 84 with a sharply radiused base corner 86, which sharpness must be maintained so that a sink does not occur in the show surface opposite rib 84 as the plastic forming the part cools after molten plastic has been injected into the cavity. If for example cover half 72 were to be repaired, it would be very difficult to fully remove characteristics occurring on ridges 82 without disrupting ridges 82, so that unwanted flash would form along some of the shutoff areas during the molding process. However, inadequate polishing of a surface on ridges 82 might cause one or more of the ribs on the speaker grill to non-uniformly release, thus causing part defeats and molding problems. Also, if the mold surface is textured, the problems become even more difficult, since reapplication of a texture can be time consuming and expensive.

Thus, a solution and method are provided to facilitate removing undesirable characteristics from repaired or reworked mold halves, the solution being inexpensive and safe, and the method being inexpensive, safe, and drastically reducing the amount of repair and/or rework time required.

In the foregoing description, it will be readily appreciated by those of ordinary skill in the art that modifications may be made to the invention without departing from the concepts disclosed herein. Such modifications are to be considered as included in the following claims, unless these claims by their language expressly state otherwise.

The embodiments of the invention in which an exclusive property or privilege is claimed are defined as follows:

1. A method for removing undesirable characteristics from mold surfaces, comprising:
   providing an aqueous solution of phosphoric acid including a non-ionic surfactant;
   providing a mold half having a mold surface defining part of a chamber to mold a plastic part, the mold surface having undesirable characteristics thereon caused by heating the mold half to an elevated temperature for repair or rework; and
   applying said solution to the mold surface and waiting several seconds, thereby removing the undesirable characteristics until the undesirable characteristics disappear, whereby the mold surface can be prepared by heating the mold half to the elevated temperature for optimal repair, which elevated temperature causes undesirable characteristics to occur in the mold surface, but the undesirable characteristics can be readily removed by applying the solution to the mold after cooling of the mold half, thus reducing the labor required to remove the undesirable characteristics and thus substantially eliminating the danger of excessive material being removed from the mold surface and substantially reducing the danger of other damage accidentally occurring to the mold surface.

2. A method as defined in claim 1 including removing any residue left on the mold surface after applying the solution.

3. A method as defined in claim 2 wherein the step of removing includes wiping off any residue on the mold surface.

4. A method as defined in claim 3 wherein the step of applying the solution includes manually applying the solution to selected areas on the mold surface.

5. A method as defined in claim 4 wherein the step of applying includes brushing the solution onto the mold surface.

6. A method as defined in claim 2 wherein the step of removing the solution is done less than about 60 seconds after the step of applying the solution.

7. A method as defined in claim 1 wherein the mold half includes a repaired mold surface including material added by welding.

8. A method as defined in claim 1 wherein the mold surface includes details defining crevices and depressions, and including applying the solution to the crevices and depressions.

9. A method as defined in claim 1 wherein the solution comprises about 10% to 25% by weight phosphoric acid.

10. A method as defined in claim 9 wherein the solution comprises about 17% to 22% by weight phosphoric acid.

11. A method as defined in claim 10 wherein the solution comprises about 17.5% to 18% by weight phosphoric acid.

12. A method as defined in claim 1 including evaporating away the aqueous portion of the solution.

13. A method as defined in claim 12 including removing any residue left on the mold surface after the step of evaporating.

14. A method as defined in claim 1 wherein the mold half is made from a clean hardenable steel commonly used for making molds for molding plastic parts.

15. A method as defined in claim 14 wherein the steel comprises about 0.3% to 0.7% carbon, about 0.8% to 2.0% manganese, about 1.0% to 2.0% chromium, and about 0.3% to 1.4% molybdenum.

16. A method as defined in claim 15 wherein the steel comprises about 0.34% carbon, about 0.95% manganese, about 1.85% chromium, about 0.38% molybdenum, about 0.015% maximum sulfur, and about 0.015% maximum phosphorous.

17. A method as defined in claim 1 wherein the aqueous solution consists essentially of phosphoric acid, water, non-ionic surfactant, and additional materials, the additional materials being substantially unreactive with the mold surface.

18. A method as defined in claim 1 wherein the undesirable characteristics are formed at elevated temperatures above 400° F.

19. A method as defined in claim 18 wherein the undesirable characteristics are formed at elevated temperatures of at least 600° F.

20. A method for repairing damage molds, comprising:
   providing a mold half made of steel and in need of repair or rework;
   reworking the mold half with a process involving heating it to elevated temperatures, the heat causing undesirable "heat discoloration" characteristics to occur on the mold half;
   providing a solution for removing the undesirable "heat discoloration" characteristics, the solution comprising phosphoric acid and a wetting agent; and
   applying said solution to the mold surface in the area of the undesirable "heat discoloration" characteristics, whereby the undesirable "heat discoloration" characteristics are removed.

21. A method as defined in claim 20 wherein the mold half is made from a clean hardenable steel commonly used for making molds for molding plastic parts.

22. A method as defined in claim 20 wherein the mold half includes mold surfaces and mold shutoffs, and the step of applying the solution includes manually applying the solution to the mold shutoffs.

23. A method as defined in claim 20 wherein the solution is aqueous and consists essentially of phosphoric acid, water, non-ionic surfactant, and additional materials, the additional materials being selected from materials which are substantially unreactive with the steel of the mold half.

24. A method as defined in claim 23 wherein the step of reworking the mold half includes heating the mold half above 400° F. and then cooling same.

25. A method as defined in claim 24 wherein the elevated temperatures are at least 600° F.

26. A method for repairing mold halves, the mold halves including a surface forming a part of a cavity for molding plastic parts therein, comprising:
   providing a mold half having a mold surface in need of repair or rework;
   heating the mold half to an elevated temperature to facilitate reworking same, the heating causing the formation of undesirable characteristics on the mold surface;
   applying material to rework an area on the mold surface;
   cooling the mold half;
   removing excess material applied to the reworked area;
   benching the reworked area to a desired surface finish;
   providing an aqueous solution of phosphoric acid including a wetting agent; and
   applying the aqueous solution of phosphoric acid to the mold half and mold surfaces as required to remove the undesirable characteristics, whereby the mold half can be expeditiously repaired or reworked with skilled labor and the undesirable characteristics can be readily removed in a time efficient manner with unskilled labor.

27. A method as defined in claim 26 including reworking the repaired area to a desired texture or pattern.

28. A method as defined in claim 27 wherein the solution comprises about 10% to 25% by weight phosphoric acid.

29. A method as defined in claim 28 wherein the step of applying the aqueous solution includes brushing the solution onto the mold.

30. A method as defined in claim 29 wherein the mold surface includes details defining crevices and depressions, and wherein the step of brushing includes brushing the solution into the crevices and depressions.

31. A method as defined in claim 26 wherein the solution consists of phosphoric acid, water, non-ionic surfactant, and additional materials, the additional materials being substantially from materials that are substantially unreactive with the mold surface.

32. A method as defined in claim 31 wherein the steel comprises about 0.3% to 0.7% carbon, about 0.8% to 2.0% manganese, about 1.0% to 2.0% chromium, and about 0.3% to 1.4% molybdenum.

33. A method as defined in claim 31 wherein the step of heating the mold half includes heating the mold half above elevated temperatures of 400° F.

34. A method as defined in claim 31 wherein the elevated temperatures are at least 600° F.

35. A solution for treating mold surfaces to remove undesirable "heat discoloration" characteristics from the mold surfaces consisting essentially of:
   a) about 10% to 25% by weight phosphoric acid;
   b) a non-ionic surfactant sufficient to promote wetting of the phosphoric acid when applied to a mold surface; and
   c) a remaining ingredient comprising substantially all water.

36. A solution as defined in claim 35 wherein the concentration of phosphoric acid comprises about 17% to 22% by weight.

37. A solution as defined in claim 36 wherein the concentration of phosphoric acid comprises about 17.5% to 18% by weight.

38. A solution as defined in claim 35 wherein the concentration of non-ionic surfactant is sufficient to cause surface wetting by said solution, said non-ionic surfactant having a concentration less then about 5% but more than 0.1%.

39. A solution as defined in claim 35 wherein the concentration of non-ionic surfactant is sufficient to cause surface wetting by said solution, said non-ionic surfactant being concentrated between about 0.5% to 1%.

40. A solution as defined in claim 39 including a desired amount of colorant and fragrance.

41. A solution as defined in claim 35 comprises about 17.5% to 18% by weight phosphoric acid and about 1% by weight non-ionic surfactant, any remaining ingredients being materials that are substantially unreactive with the mold surfaces.

* * * * *

UNITED STATES PATENT AND TRADEMARK OFFICE
CERTIFICATE OF CORRECTION

PATENT NO. : 5,279,707

DATED : January 18, 1994

INVENTOR(S) : Andrew D. Ruse

It is certified that error appears in the above-identified patent and that said Letters Patent is hereby corrected as shown below:

Column 1, line 22;
    After "used" insert --.--.

Column 4, line 44;
    "olean" should be --clean--.

Column 5, line 1;
    Before "FIGS." insert --(--.

Column 5, line 50;
    After "welding" insert --.--.

Column 6, line 53;
    "olean" should be --clean--.

Column 7, line 61;
    "defeats" should be --defects--.
Column 10, line 38;
    "substantially" should be --selected--.

Signed and Sealed this

Thirteenth Day of September, 1994

Attest:

BRUCE LEHMAN

*Attesting Officer*          *Commissioner of Patents and Trademarks*